(12) United States Patent
Takahashi et al.

(10) Patent No.: US 9,542,971 B2
(45) Date of Patent: Jan. 10, 2017

(54) OPTICAL DISC LIBRARY APPARATUS HAVING MAGAZINE-DISC ASSOCIATION INFORMATION, OPTICAL DISC, AND OPTICAL DISC LIBRARY SYSTEM

(71) Applicant: Panasonic Intellectual Property Management Co., Ltd., Osaka (JP)

(72) Inventors: Yoshihisa Takahashi, Osaka (JP); Akihito Yoshimi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/947,638

(22) Filed: Nov. 20, 2015

(65) Prior Publication Data

US 2016/0155463 A1 Jun. 2, 2016

(30) Foreign Application Priority Data

Dec. 2, 2014 (JP) ................... 2014-243603

(51) Int. Cl.

| G11B 21/08 | (2006.01) |
|---|---|
| G11B 17/22 | (2006.01) |
| G11B 7/24094 | (2013.01) |
| G11B 27/10 | (2006.01) |
| G06F 3/06 | (2006.01) |
| G06F 11/10 | (2006.01) |
| G11B 20/18 | (2006.01) |

(52) U.S. Cl.
CPC ............ *G11B 17/228* (2013.01); *G06F 3/06* (2013.01); *G06F 11/10* (2013.01); *G11B 7/24094* (2013.01); *G11B 17/22* (2013.01); *G11B 27/10* (2013.01); *G11B 20/1833* (2013.01)

(58) Field of Classification Search
None
See application file for complete search history.

(56) References Cited

U.S. PATENT DOCUMENTS 6,185,165 B1 * 2/2001 Jesionowski ...... G11B 15/6835
369/30.34
6,205,093 B1 * 3/2001 Abbott ............... G11B 15/6815
360/92.1

(Continued)

FOREIGN PATENT DOCUMENTS

| JP | 09-212984 A | 8/1997 |
| JP | 2000-251371 A | 9/2000 |

(Continued)

*Primary Examiner* — Tan X Dinh
(74) *Attorney, Agent, or Firm* — Renner, Otto, Boisselle & Sklar, LLP

(57) ABSTRACT

The optical disc library apparatus of the present disclosure includes one or more magazines configured to store a plurality of optical discs, a plurality of optical disc drives configured to perform recording or reproducing on or from the optical discs, a changer mechanism configured to perform loading or ejecting any optical disc stored in the magazine to or from any optical disc drive, and a controller configured to control the changer mechanism. The magazine includes magazine-disc association information associating magazine information specifying the magazine with disc information specifying a plurality of optical discs to be stored in the magazine. The controller outputs the magazine-disc association information.

9 Claims, 12 Drawing Sheets

| | | Magazine specific ID information | 0123456789 |
|---|---|---|---|
| 300 | Magazine information | Manufacturing date | December 2, 2014 |
| | | Manufacturing place | Factory A/line 5 |
| | | Number of discs | Twelve |
| | | Position information | Disc specific ID information |
| | | First | 00110000001 |
| | | Second | 00110000005 |
| | | Third | 00110000013 |
| | | Fourth | 00110000024 |
| 301 | Disc information | Fifth | 00110000050 |
| | | Sixth | 00110000032 |
| | | Seventh | 00110000102 |
| | | Eighth | 00110000064 |
| | | Ninth | 00110000087 |
| | | Tenth | 00110000022 |
| | | Eleventh | 00110000049 |
| | | Twelfth | 00110000071 |
| 302 | User information | Magazine name | Magazine ABC |

(56) References Cited

U.S. PATENT DOCUMENTS

| | | | |
|---|---|---|---|
| 6,366,550 B1 | 4/2002 | Shiba | |
| 6,870,797 B2 * | 3/2005 | Reasoner | G11B 15/07 369/30.29 |
| 7,628,332 B2 * | 12/2009 | Kaneko | G11B 15/682 235/462.46 |
| 8,082,058 B2 * | 12/2011 | Thompson | G11B 15/689 360/69 |
| 2002/0114096 A1 * | 8/2002 | Gardner, Jr. | G11B 15/1816 360/69 |
| 2005/0007692 A1 * | 1/2005 | Thompson | G11B 15/6835 360/93 |
| 2005/0083796 A1 * | 4/2005 | Gold | G11B 17/22 369/30.27 |
| 2007/0127323 A1 * | 6/2007 | Owens | G11B 17/225 369/30.38 |
| 2009/0109565 A1 * | 4/2009 | Thompson | G11B 23/042 360/69 |
| 2010/0254241 A1 * | 10/2010 | Aoki | G06F 3/0605 369/84 |
| 2013/0263162 A1 | 10/2013 | Yoshida et al. | |
| 2014/0075116 A1 | 3/2014 | Takahashi et al. | |
| 2014/0289750 A1 | 9/2014 | Yoshida et al. | |

FOREIGN PATENT DOCUMENTS

| | | |
|---|---|---|
| JP | 2008-165895 A | 7/2008 |
| JP | 2013-206498 A | 10/2013 |

* cited by examiner

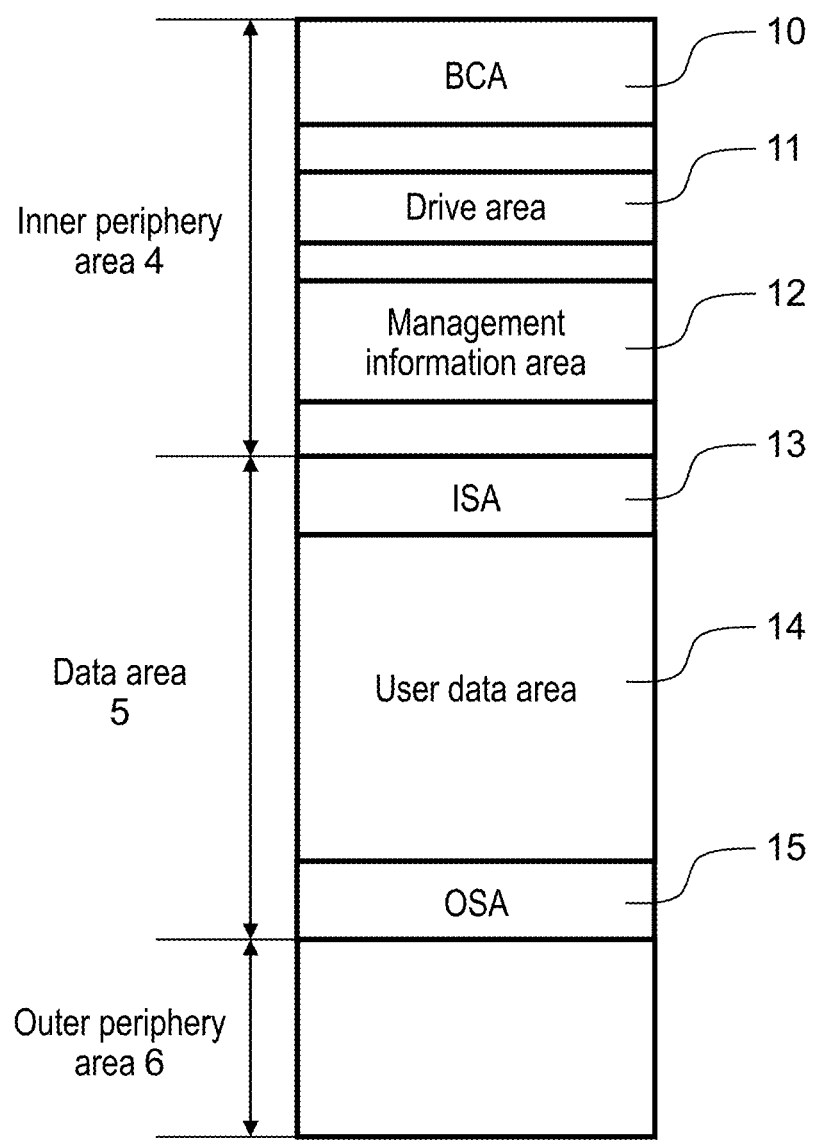

FIG. 4

| | | |
|---|---|---|
| 300 — Magazine information | Magazine specific ID information | 0123456789 |
| | Manufacturing date | December 2, 2014 |
| | Manufacturing place | Factory A/line 5 |
| | Number of discs | Twelve |
| 301 — Disc information | Position information | Disc specific ID information |
| | First | 00110000001 |
| | Second | 00110000005 |
| | Third | 00110000013 |
| | Fourth | 00110000024 |
| | Fifth | 00110000050 |
| | Sixth | 00110000032 |
| | Seventh | 00110000102 |
| | Eighth | 00110000064 |
| | Ninth | 00110000087 |
| | Tenth | 00110000022 |
| | Eleventh | 00110000049 |
| | Twelfth | 00110000071 |
| 302 — User information | Magazine name | Magazine ABC |

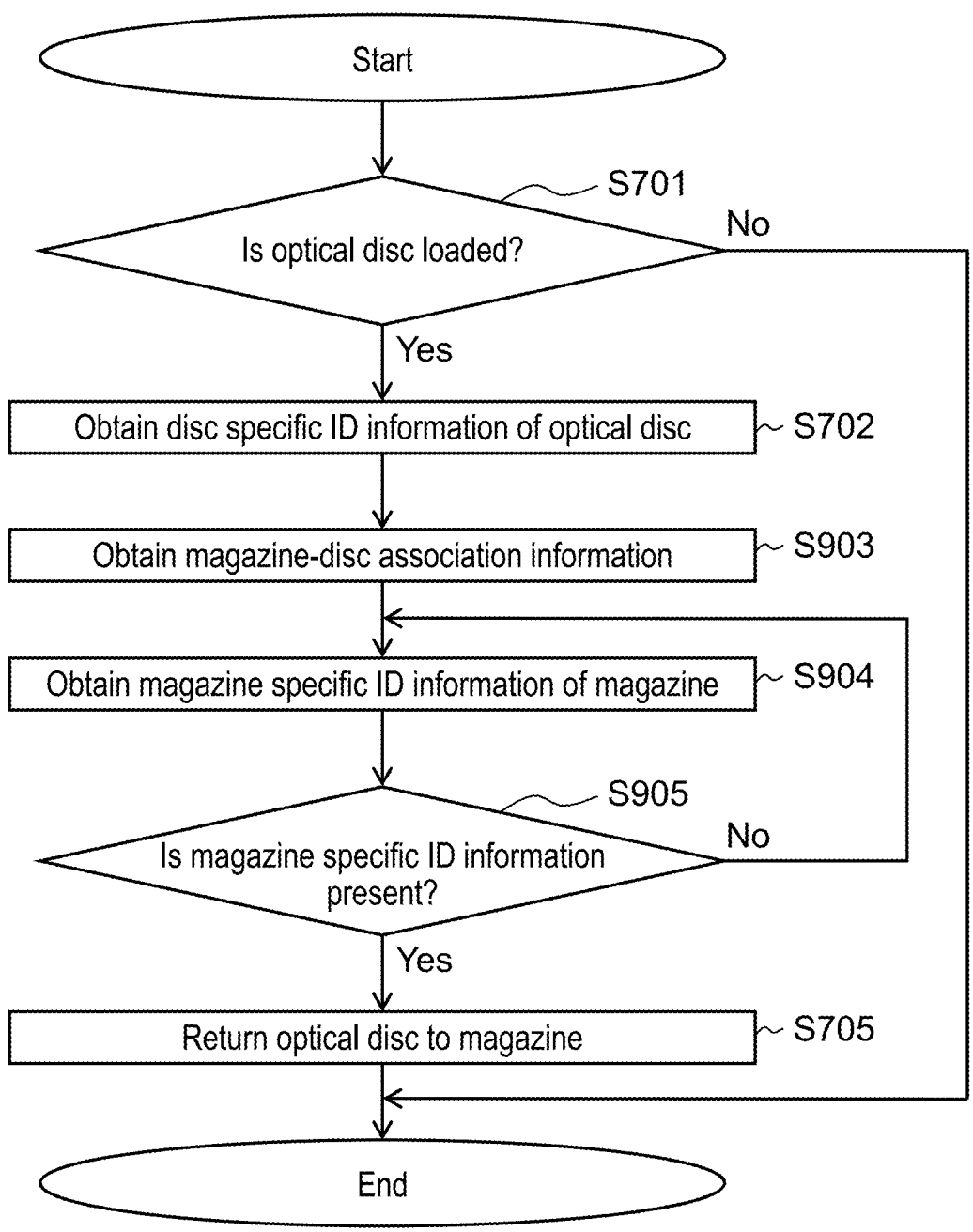

FIG. 10A

| | | | |
|---|---|---|---|
| Magazine information (300) | Magazine specific ID information | 0123456789 | |
| | Manufacturing date | December 2, 2014 | |
| | Manufacturing place | Factory A/line 5 | |
| | Number of discs | Twelve | |
| Disc information (1001) | Position information | Disc specific ID information | Actual position information |
| | First | 00110000001 | 01 |
| | Second | 00110000005 | 02 |
| | Third | 00110000013 | 03 |
| | Fourth | 00110000024 | 04 |
| | Fifth | 00110000050 | 05 |
| | Sixth | 00110000032 | 06 |
| | Seventh | 00110000102 | 07 |
| | Eighth | 00110000064 | 08 |
| | Ninth | 00110000087 | 09 |
| | Tenth | 00110000022 | 10 |
| | Eleventh | 00110000049 | 11 |
| | Twelfth | 00110000071 | 12 |
| User information (302) | Magazine name | Magazine ABC | |

FIG. 10B

| | | | |
|---|---|---|---|
| 300 — Magazine information | Magazine specific ID information | 0123456789 | |
| | Manufacturing date | December 2, 2014 | |
| | Manufacturing place | Factory A/line 5 | |
| | Number of discs | Twelve | |
| 1001 — Disc information | Position information | Disc specific ID information | Actual position information |
| | First | 00110000001 | 01 |
| | Second | 00110000005 | 02 |
| | Third | 00110000013 | 03 |
| | Fourth | 00110000024 | 04 |
| | Fifth | 00110000050 | 05 |
| | Sixth | 00110000032 | - |
| | Seventh | 00110000102 | 06 |
| | Eighth | 00110000064 | 07 |
| | Ninth | 00110000087 | 08 |
| | Tenth | 00110000022 | 09 |
| | Eleventh | 00110000049 | 10 |
| | Twelfth | 00110000071 | 11 |
| 302 — User information | Magazine name | Magazine ABC | |

FIG. 10C

| | | | |
|---|---|---|---|
| 300 — Magazine information | Magazine specific ID information | 0123456789 | |
| | Manufacturing date | December 2, 2014 | |
| | Manufacturing place | Factory A/line 5 | |
| | Number of discs | Twelve | |
| 1001 — Disc information | Position information | Disc specific ID information | Actual position information |
| | First | 00110000001 | 01 |
| | Second | 00110000005 | 02 |
| | Third | 00110000013 | 03 |
| | Fourth | 00110000024 | 04 |
| | Fifth | 00110000050 | 05 |
| | Sixth | 00110000032 | 12 |
| | Seventh | 00110000102 | 06 |
| | Eighth | 00110000064 | 07 |
| | Ninth | 00110000087 | 08 |
| | Tenth | 00110000022 | 09 |
| | Eleventh | 00110000049 | 10 |
| | Twelfth | 00110000071 | 11 |
| 302 — User information | Magazine name | Magazine ABC | |

US 9,542,971 B2

OPTICAL DISC LIBRARY APPARATUS HAVING MAGAZINE-DISC ASSOCIATION INFORMATION, OPTICAL DISC, AND OPTICAL DISC LIBRARY SYSTEM

BACKGROUND OF THE INVENTION

1. Field of the Invention

The present disclosure relates to an optical disc library apparatus for taking out a portable optical disc stored in a magazine from the magazine and carrying the optical disc to any optical disc drive, an optical disc to be used in the apparatus, and an optical disc library system configured by using an optical disc library apparatus.

2. Description of the Related Art

In recent years, an amount of data to be stored in a large-scale data center is rapidly increasing, and accordingly an amount of less accessed data in the data to be stored also tends to increase. Therefore, a library apparatus for archiving less accessed data into a portable information recording medium, which is able to reduce power consumption and to be suitable for long-period storage, attracts attention.

The portable information storage medium is an optical disc such as a DVD (Digital Versatile Disc) or a Blu-ray (registered trademark) Disc (hereinafter, BD). The optical disc roughly includes a rewritable information storage medium such as a DVD-RAM or a BD-RE, and a recordable information storage medium such as a DVD-R, a DVD+R, or a BD-R. Further in recent years, a new more large-capacity BD disc is being developed.

The optical disc is superior to a hard disc drive (HDD) or a magnetic tape such as a Linear Tape-Open (LTO) in terms of warranty of the data for fifty years, namely, semi-permanently.

According to the high capacity of the optical disc in recent years, a recordable optical disc that is more inexpensive than a rewritable optical disc has a greater opportunity to be used for archiving less accessed data.

As a library apparatus for archiving in an optical disc, a library apparatus that includes a plurality of optical disc drives and utilizes a plurality of optical discs which is stored in a cartridge case (hereinafter, magazine) is disclosed (for example, see Patent Literature 1). This library apparatus performs recording or reproducing on or from the plurality of optical discs by unit of magazine collectively and transfer speeds of the recording or reproducing can be improved. Further, the optical discs are put into the magazine, so that the library apparatus can restrain lowering factors in reliability of the optical discs such as fingerprints and scratches.

Further, as the library apparatus using the magazine storing the plurality of optical discs, a disc array as one virtual large volume is structured in a plurality of optical discs in a magazine and in a plurality of optical disc drives. The library apparatus performs recording or reproducing on or from the disc array i.e. a RAID (Redundant Array of Inexpensive Disks). As a result, the library apparatus, in which recording or reproducing data is highly-reliable, is disclosed (for example, see Patent Literature 2).

CITATION LIST

Patent Literatures

PTL 1: Unexamined Japanese Patent Publication No. 2013-206498
PTL 2: U.S. Patent Publication No. 2014/0075116

SUMMARY OF THE INVENTION

Both the above library apparatuses are presupposed that the plurality of optical discs in the magazine is treated in a collective manner, and thus are configured with no regard for treating the optical discs and the optical disc drives one by one. However, some users desire to treat the plurality of optical discs by unit of magazine in a collective manner but to treat the optical discs one by one for recording or reproducing, namely, do not desire to treat them by unit of magazine for recording or reproducing in a collective manner. More concretely, such users desire to perform recording or reproducing on or from one optical disc in the plurality of optical discs in the magazine independently in the plurality of optical disc drives, namely, desire to use the library apparatus as a multi-accessible apparatus.

Further, when the plurality of optical discs is stored in the magazine, the library apparatus is not sufficiently considered about a case where a correspondence between the plurality of optical discs and the magazine falls apart. Concretely, an abnormal state such that combinations of the plurality of optical discs configuring RAID become unclear is considered a little in the above library apparatuses, but the library apparatuses basically presuppose simultaneous formatting and recording on all the optical discs in the magazine. For this reason, the abnormal state such that when recorded optical discs and unrecorded optical discs coexist in one magazine, combinations of the plurality of optical discs become unclear is not taken into consideration. For this reason, in the above library apparatuses, ability and reliability of the library apparatuses are not sufficient.

The present disclosure is devised in view of such a problem, and its object is to provide an optical disc library apparatus, an optical disc, and an optical disc library system that when any of a plurality of optical discs stored in a magazine can be taken out and taken in one by one from the magazine and recorded optical discs and unrecorded optical discs coexist in the magazine, appropriate combination of the magazine and the optical discs can be restored even if a failure or abnormal stop of the library apparatus occurs.

The optical disc library apparatus of the present disclosure includes one or more magazines configured to store a plurality of optical discs, a plurality of optical disc drives configured to perform recording or reproducing on or from the optical discs, a changer mechanism configured to perform loading or ejecting any of optical discs stored in the magazine to or from any of optical disc drives, and a controller configured to control the changer mechanism. The magazine includes magazine-disc association information associating magazine information specifying each magazine with disc information specifying a plurality of optical discs to be stored in each magazine. The controller outputs the magazine-disc association information.

In the optical disc library apparatus of the present disclosure where the plurality of optical discs is stored in each magazine and any of the plurality of optical discs can be taken out and taken in each magazine one by one, magazine specific Identification (ID) information specifying the magazines uniquely, disc specific ID information specifying all the optical discs stored in each magazine uniquely, and position information of the optical discs in each magazine can be managed. For this reason, if any trouble such as a failure or abnormal stop of the optical disc library apparatus occurs, the optical discs can be returned to the original positions of each magazine. Further, when recorded optical discs and unrecorded optical discs coexist in the magazine, the optical discs can be returned to original positions of the magazine if a failure or abnormal stop of the optical disc library apparatus occurs.

BRIEF DESCRIPTION OF DRAWINGS

FIG. 2 is a diagram describing a structure of an area of the optical disc according to the first exemplary embodiment;

FIG. 4 is a diagram describing one example of magazine-disc association information stored in a Radio Frequency IDentifier (RFID) tag according to the first exemplary embodiment;

FIG. 9 is still another flowchart describing the recovery process according to the first exemplary embodiment;

FIG. 10A is a diagram describing one example of the magazine-disc association information stored in the RFID tag according to a second exemplary embodiment;

FIG. 10B is a diagram describing another example of the magazine-disc association information stored in the RFID tag according to the second exemplary embodiment; and FIG. 10C is a diagram describing still another example of the magazine-disc association information stored in the RFID tag according to the second exemplary embodiment.

DETAILED DESCRIPTION OF THE PREFERRED EMBODIMENTS

Exemplary embodiments are described in detail below suitably with reference to the drawings. Description that is detailed beyond necessity is occasionally omitted. For example, detailed description about already well-known matters and overlapped description about the practically same constitutions are occasionally omitted. This is because the following description is avoided from becoming redundant beyond necessity, and a person skilled in the art is made to easily understand the description.

The accompanying drawings and the following description are given in order to make the person skilled in the art to sufficiently understand the present disclosure, and they are not intended to limit the subject matter described in Claims.

First Exemplary Embodiment

An optical disc and an optical disc library system according to a first exemplary embodiment are described below with reference to the drawings. Identical components are denoted by identical reference symbols, and repetition of the description is omitted.

The present exemplary embodiment presupposes that a plurality of optical discs in a magazine is treated one by one and a plurality of optical disc drives is treated one by one.

Further the present exemplary embodiment exemplifies a recordable optical disc as the optical disc.

1. Constitution 1-1. Structure of the Optical Disc

Figure 1:
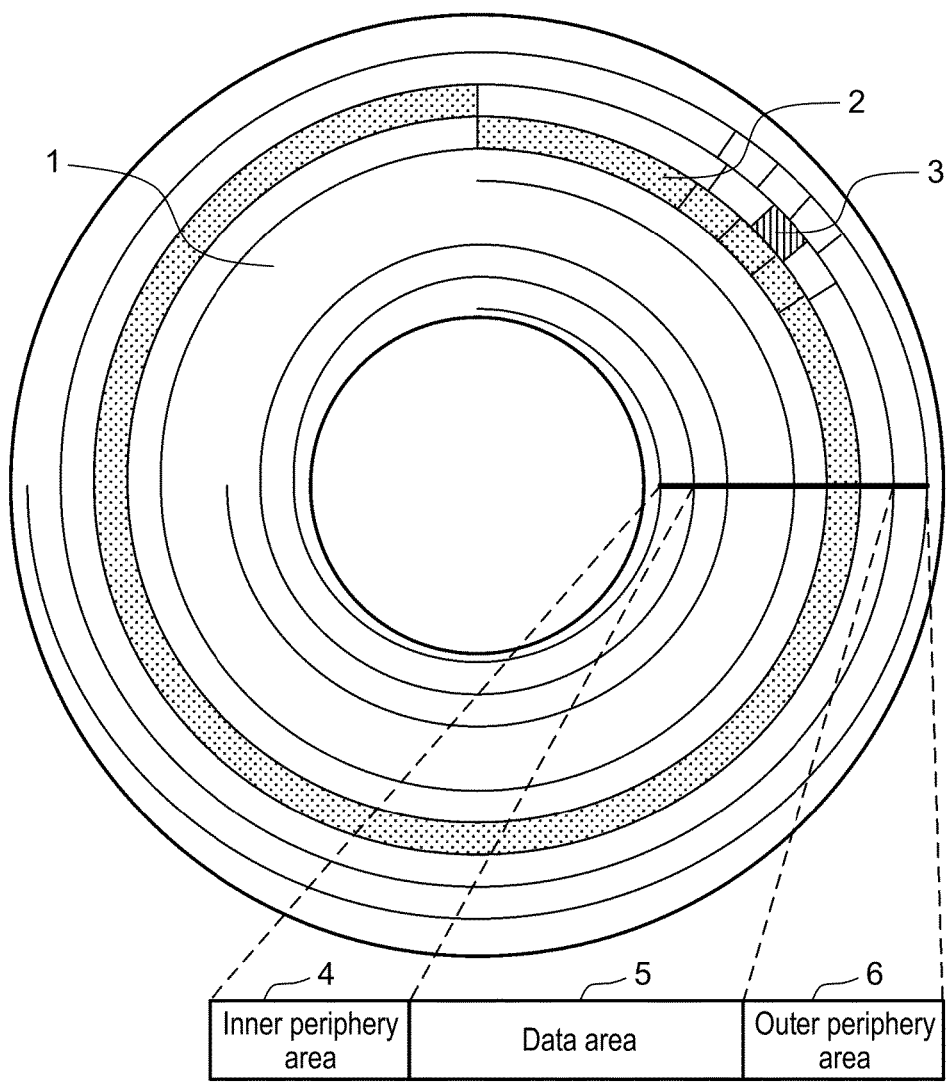
FIG. 1 is a constitutional diagram illustrating an optical disc according to a first exemplary embodiment.

FIG. 1 is a constitutional diagram illustrating the optical disc according to the present exemplary embodiment. Disc-shaped optical disc 1 includes one or more recording layers where information can be recorded or reproduced. The recording layer is formed with a lot of tracks 2 in a spiral shape, and each of tracks 2 is formed with a lot of blocks 3 for finely dividing each track 2. In each of tracks 2, grooves are wobbled so that address information representing detailed positions on the disc (hereinafter, physical addresses) is given to the grooves.

Each of tracks 2 is generally formed by combinations of the grooves and lands (inter-grooves). However, in a case of the optical disc such that data in the optical disc is recorded in both the grooves and the lands to improve recording density, the address information may be given to one spiral of the grooves and the lands of each of tracks 2.

A track pitch that is a width of each track 2 is 0.32 μm in a case of, for example, BD. Further, each of blocks 3 is a unit of error correction, and is a minimum unit in which recording or reproducing operations are performed. In a case of, for example, DVD, each of blocks 3 has a size of 1 ECC (size: 32 Kbytes), and in a case of BD, each of blocks 3 has a size of 1 cluster (size: 64 Kbytes). When a sector (size: 2 Kbytes) that is a minimum unit of data in the optical disc is used, 1 ECC=16 sectors, and 1 cluster=32 sectors.

Further, optical disc 1 is roughly divided into inner periphery area 4, data area 5, and outer periphery area 6.

FIG. 2 is a diagram describing a structure of the areas of optical disc 1 according to the present exemplary embodiment. Data area 5 is composed of user data area 14 where user data is recorded, Inner Spare Area (ISA) 13 that is a spare area having an alternate area to be used for alternative recording of a defective area detected in user data area 14, and Outer Spare Area (OSA) 15.

Inner periphery area 4 and outer periphery area 6 mainly include areas where management information necessary for the recording or reproducing on or from optical disc 1 is recorded. For this reason, inner periphery area 4 and outer periphery area 6 serve as overlap widths when an optical pick up accesses an end of data area 5 and overruns, the optical pickup can follow track 2. Inner periphery area 4 and outer periphery area 6 are areas where user data cannot be recorded or reproduced, differently from user data area 14.

Inner periphery area 4 includes Burst Cutting Area (BCA) 10, Drive Area 11, and management information area 12.

BCA 10 is a prerecording area which includes information relating to optical disc 1 and information specific to optical disc 1 and is formed on a bar code during manufacturing of optical disc 1 by using a special apparatus. BCA 10 is formed by removing a reflective film using a laser. For example, information such as a serial number specific to optical disc 1 is stored in BCA 10.

Drive Area 11 is an area where information necessary for controlling an optical disc drive, described later, is recorded.

Management information area 12 is an area where management information, such as information relating to an area structure of data area 5 in optical disc 1, information relating to a defective block, and information representing a recording state of optical disc 1, is recorded transiently.

Inner periphery area 4 includes an Optimum Power Calibration (OPC) area where a recording power of optical disc drive 210, described later, is adjusted, and a prewrite area where tracking/focus adjustment is made, but description thereof is omitted.

Outer periphery area 6 does not need to be always provided. Similarly to inner periphery area 4, management information area 12, an OPC area, and a prewrite area may be stored in outer periphery area 6.

1-2. Constitution of the Magazine

Figure 3A:
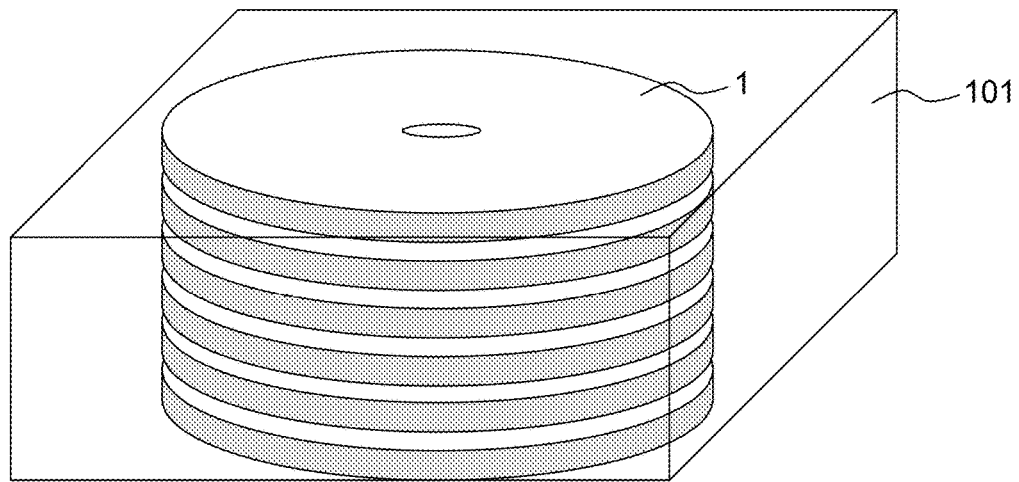
FIG. 3A is a diagram describing a constitution of a magazine according to the first exemplary embodiment.
Figure 3B:
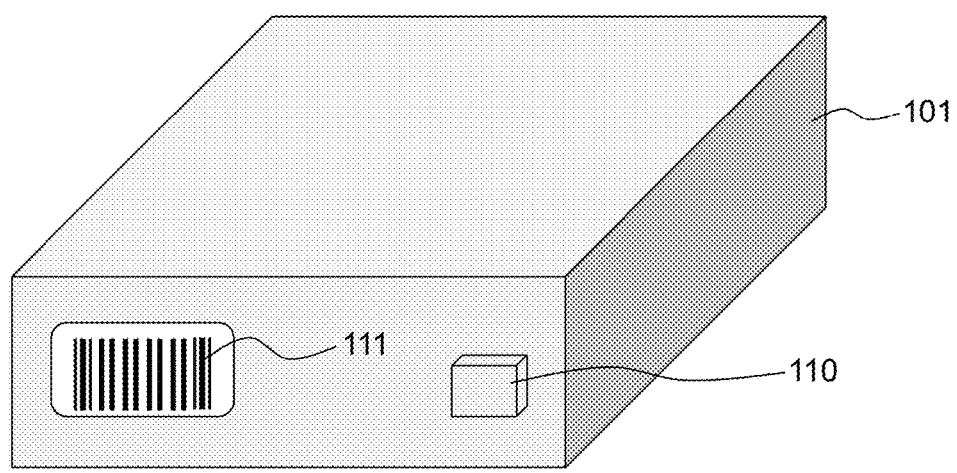
FIG. 3B is an outline view of the magazine according to the first exemplary embodiment.

FIG. 3A is a diagram describing a constitution of the magazine according to the present exemplary embodiment, and FIG. 3B is an outline view of the magazine according to the present exemplary embodiment. As shown in FIG. 3A, a plurality of optical discs 1 is stored in magazine 101. In the present exemplary embodiment, twelve optical discs 1 are stored in one magazine 101.

Magazine 101 is not provided with a tray in order to improve an accumulation capacity of optical discs 1. Optical discs 1 are directly stacked to be stored in magazine 101 in a direct stacking manner. Further, magazine 101 is formed by an exterior frame case and a disc storage box, and when optical disc 1 is taken out, the disc storage box is taken out from the exterior frame case.

The constitution of magazine 101 is one example, and magazine 101 may have any mode and shape as long as magazine 101 can store the plurality of optical discs 1.

As shown in FIG. 3B, Radio Frequency IDentifier (RFID) tag 110 for storing information relating to magazine 101 is embedded in an outside of magazine 101. Further, similarly to RFID tag 110, bar code 111 for storing information relating to magazine 101 is stuck to the outside of magazine 101.

FIG. 4 is a diagram describing one example of magazine-disc association information stored in RFID tag 110 according to the present exemplary embodiment. As shown in FIG. 4, the magazine-disc association information stored in RFID tag 110 includes magazine information 300 for specifying magazine 101, disc information 301 for specifying the plurality of optical discs 1 stored in specified magazine 101, and user information 302.

Magazine information 300 is information to be specified during manufacturing of magazine 101. Magazine information 300 includes magazine specific ID information as information specific to magazine 101, related information about magazine 101 such as a manufacturing date and a manufacturing place of magazine 101, and a number of stored optical discs 1, and the like. In FIG. 4, "0123456789" as the magazine specific ID information, "Dec. 2, 2014" as the manufacturing date, "A factory/line 5" as the manufacturing place, and "12" as the number of stored discs are stored in magazine information 300. Magazine information 300 is information which is not rewritten when the information is specified during manufacturing of the magazine.

In the foregoing description, magazine information 300 is one example, and magazine information 300 may be any information as long as magazine 101 can be identified uniquely by the information.

Information relating to twelve optical discs 1 stored in magazine 101 is stored in disc information 301. Concretely, disc information 301 includes disc specific ID information as serial numbers stored in BCAs 10 of twelve optical discs 1 stored in magazine 101 and position information of twelve optical discs 1 in magazine 101.

In FIG. 4, disc information 301 stores optical disc 1 with disc specific ID information "00110000001" as a first disc on the top of magazine 101, optical disc 1 with disc specific ID information "00110000005" as a second disc, optical disc 1 with disc specific ID information "00110000013" as a third disc, optical disc 1 with disc specific ID information "00110000024" as a fourth disc, optical disc 1 with disc specific ID information "00110000050" as a fifth disc, optical disc 1 with disc specific ID information "00110000032" as a sixth disc, optical disc 1 with disc specific ID information "00110000102" as a seventh disc, optical disc 1 with disc specific ID information "00110000064" as an eighth disc, optical disc 1 with disc specific ID information "00110000087" as a ninth disc, optical disc 1 with disc specific ID information "00110000022" as a tenth disc, optical disc 1 with disc specific ID information "00110000049" as an eleventh disc, and optical disc 1 with disc specific ID information "00110000071" as a twelfth disc.

When twelve optical discs 1 are specified in magazine 101 during manufacturing of the magazine, disc information 301 cannot be rewritten.

User information 302 can be freely recorded by a user who uses magazine 101. As user information 302, unfixed or predetermined information is recorded during manufacturing of magazine 101, and any information is recorded according to necessity during use of magazine 101. For example, in FIG. 4, "magazine ABC" is stored as "magazine name" in user information 302.

The example described here is only example, and thus the user can set any information.

The magazine-disc association information of RFID tag 110 includes magazine information 300, disc information 301, and user information 302. Information for specifying magazine 101 is associated with information for specifying twelve optical discs 1 stored in specified magazine 101, and these pieces of information are recorded so as to be managed by an optical disc library apparatus, described later.

The information for specifying magazine 101 and the information for specifying twelve optical discs 1 stored in specified magazine 101 are associated with each other so as to be recorded and recovery is enabled when abnormality occurs. For example, in the optical disc library apparatus, described later, when abnormality occurs during using any optical disc 1 taken out from any magazine 101 or when twelve optical discs 1 stored in any magazine 101 scatter by accident, the optical disc library apparatus can recover that stored magazine 101 for optical disc 1 outside of magazine 101 is specified and an original position for optical disc 1 in specified magazine 101 is specified.

Magazine 101 is associated with optical discs 1 in this manner, optical discs 1 can be specified for magazine 101.

The magazine-disc association information may include at least the magazine specific ID information of magazine information 300, and the disc specific ID information and the position information of disc information 301.

Further, the magazine-disc association information stored in RFID tag 110 is stored also in bar code 111.

Bar code 111 may be a one-dimensional bar code of a stripe pattern, or a two-dimensional bar code such as a QR code (registered trademark).

In the present exemplary embodiment, both RFID tag 110 and bar code 111 are on an outside of magazine 101, but any one of them may be on an outside of magazine 101.

In the description, the disc specific ID information stores serial number stored in BCA 10 of each of twelve optical discs 1 stored in magazine 101, respectively, but such information may be any information specified optical discs 1 uniquely. For example, the RFID tags are given specific information with respect to optical discs 1, respectively, and the specific information may be the disc specific ID information.

Further, during manufacturing of magazine 101, optical disc 1 is preformatted and specific information with respect to optical disc 1 is recorded in a predetermined area of optical disc 1 before optical disc 1 is stored in magazine 101. This specific information may be recorded as the disc specific ID information of disc information 301 in the magazine-disc association information of RFID tag 110. The specific information with respect to optical disc 1 may be generated by, for example, combining the magazine specific ID information stored in RFID tag 110 of magazine 101 with the position information of optical disc 1 in magazine 101. For example, the specific ID information of first optical disc 1 may be "012345678901" obtained by combining the magazine specific ID information "0123456789" with the position information "01", and the specific ID information of twelfth optical disc 1 may be "012345678912" obtained by combining the magazine specific ID information "0123456789" with the position information "12".

The magazine-disc association information recorded in RFID tag 110 is not guaranteed semi-permanent reading, and deterioration progresses with time after final writing, and proper data is in danger of not being able to be read after elapsing a predetermined time. For this reason, the magazine specific ID information and the position information of optical discs 1 in magazine 101 are recorded as the disc specific ID information in predetermined area of optical disc 1, so that association information of magazine 101 and optical discs 1 can be stored for fifty years, namely, semi-permanently. Further, the magazine-disc association information stored in RFID tag 110 of magazine 101 associated with optical disc 1 is restored from optical disc 1, and the restored magazine-disc association information is again recorded in RFID tag 110, so that data of RFID tag 110 can be recovered.

1-3. Constitution of the Optical Disc Library System

Figure 5:
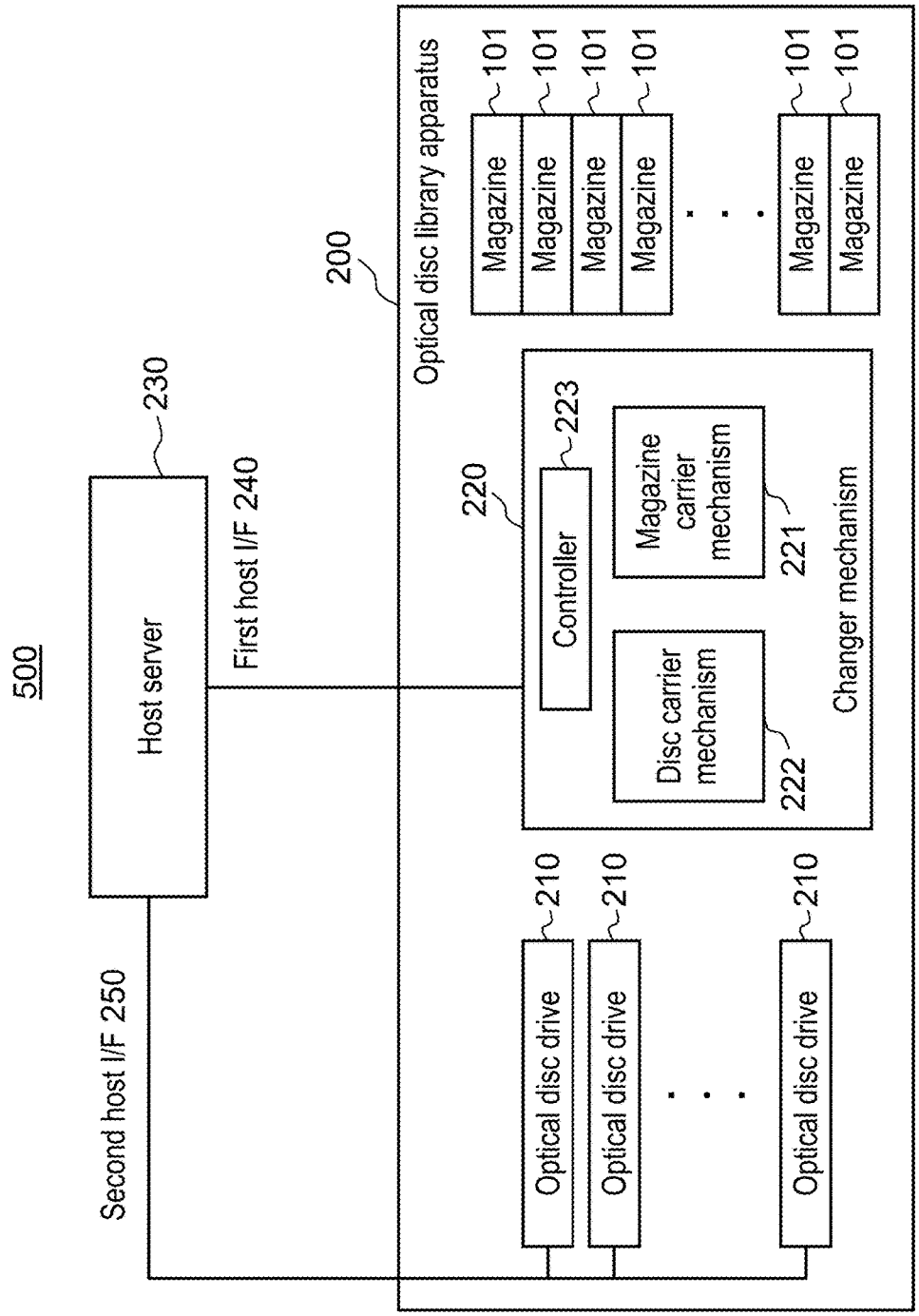
FIG. 5 is a constitutional diagram illustrating an optical disc library system according to the first exemplary embodiment.

FIG. 5 is a constitutional diagram illustrating an optical disc library system according to the present exemplary embodiment. In FIG. 5, optical disc library system 500 is composed of optical disc library apparatus 200 and host server 230 for controlling optical disc library apparatus 200. Optical disc library apparatus 200 is connected to host server 230 via first host I/F 240 and second host I/F 250 as host I/Fs.

Optical disc library apparatus 200 includes changer mechanism 220 and twelve optical disc drives 210. Further, a plurality of magazines 101 is attachable to optical disc library apparatus 200. Each of magazines 101 is configured so as to be detachable from optical disc library apparatus 200 via a drawer and a mail box.

First host I/F 240 is an I/F for communicating with and controlling changer mechanism 220 of optical disc library apparatus 200, and for example, an iSCSI (Internet Small Computer System Interface) or an USB (Universal Serial Bus) is used.

Second host I/F 250 is an I/F for communicating with and controlling twelve optical disc drives 210 of optical disc library apparatus 200, and for example, a parallel communication system such as an SAS (Serial Attached SCSI), an iSCSI, an FC (Fiber Channel), or an SATA (Serial ATA) is used. Twelve optical disc drives 210 are connected from host server 230 one by one via second host I/F 250 so as to be controllable.

Optical disc library apparatus 200 may be provided with an SAS-SATA converting substrate, host server 230 and optical disc library apparatus 200 are connected by SAS connection, and host server 230 and twelve optical disc drives 210 in optical disc library apparatus 200 are connected by STAT connection respectively.

Changer mechanism 220 of optical disc library apparatus 200 is composed of two mechanisms including magazine carrier mechanism 221 and disc carrier mechanism 222, and controller 223 such as a microcomputer for controlling these two mechanisms.

Magazine carrier mechanism 221 selects one magazine 101 from the plurality of magazines 101 based on an instruction from host server 230, and carries selected magazine 101 to optical disc drive 210. Magazine carrier mechanism 221 includes an RFID reader and a bar code reader, not shown, in order to read RFID tag 110 of magazine 101 and information of bar code 111.

Disc carrier mechanism 222 captures twelve optical discs 1 stored in magazine 101 carried by magazine carrier mechanism 221 based on an instruction from host server 230, and loads predetermined one optical disc 1 to predetermined optical disc drive 210. Further, disc carrier mechanism 222 ejects predetermined optical disc 1 from predetermined optical disc drive 210 based on an instruction from host server 230, and returns ejected optical disc 1 to original magazine 101.

In optical disc library apparatus 200, magazine carrier mechanism 221 and disc carrier mechanism 222 need physical position information representing that twelve optical disc drives 210 are disposed and physical position information representing that the plurality of magazines 101 is disposed for operating. The physical positions of twelve optical disc drives 210 and the physical positions of the plurality of magazines 101 are predetermined.

Stacks for attaching magazines 101 are equipped inside optical disc library apparatus 200, and the plurality of magazines 101 is attached to the stacks, respectively. The physical positions of the plurality of magazines 101 are specified at the timing of an initializing process or the timing of setup of optical disc library apparatus 200.

Controller 223 controls that magazine carrier mechanism 221 reads RFID tags 110 and bar codes 111 for stacks attached with magazine 101 and identifies relation between positions of the stacks and magazine specific ID information of magazines 101. And controller 223 generates magazine correspondence information for relating the physical positions of magazines 101 with magazine specific ID information of magazines 101.

Twelve optical disc drives 210 specify physical positions of optical disc drives 210 based on signal information from physical wire connection of optical disc drives 210.

Drive specific ID information as serial numbers to be uniquely allocated to optical disc drives 210 during manufacturing is used for information of specifying optical disc drives 210.

Controller 223 generates optical disc drive correspondence information for relating the physical positions of optical disc drives 210 to the drive specific ID information.

The magazine correspondence information and the optical disc drive correspondence information are managed by optical disc library apparatus 200 or host server 230, and controller 223 operates magazine carrier mechanism 221 and disc carrier mechanism 222 based on these pieces of information.

Optical disc library apparatus 200 according to the present exemplary embodiment has a function for notifying host server 230 of information for recovering optical disc library apparatus 200 at a time of abnormal stop and failure.

Concretely, optical disc library apparatus 200 has a function for notifying host server 230 of the magazine-disc association information stored in RFID tag 110 and bar code 111 via first host I/F 240.

Further, optical disc library apparatus 200 has a function for notifying host server 230 of changer specific ID information for specifying changer mechanism 220 as a serial number to be allocated during manufacturing of changer mechanism 220 in order to recover from abnormal stop or a failure. Further, optical disc library apparatus 200 has a function for notifying host server 230 of state information about changer mechanism 220, specifically, a state whether magazine carrier mechanism 221 captures magazine 101 or not, and the magazine specific ID information about magazine 101 captured in a state that magazine carrier mechanism 221 captures magazine 101.

Further, optical disc library apparatus 200 has a function for notifying host server 230 of the drive specific ID information about twelve optical disc drives 210 provided to optical disc library apparatus 200 in order to recover from abnormal stop or a failure. The optical disc library apparatus 200 has a function for notifying host server 230 of state information about optical disc drives 210, specifically a state representing whether optical discs 1 are loaded to optical disc drives 210 or not, and disc specific ID information about optical discs 1 loaded in a state that optical discs 1 are loaded to optical disc drives 210.

Further, when information about RFID tag 110 cannot be read or bar code 111 is damaged so as to be incapable of being read, optical disc library apparatus 200 cannot notify host server 230 of the magazine-disc association information. In order to avoid such a trouble, a memory such as a nonvolatile memory is provided to optical disc library apparatus 200, and the same information as RFID tag 110 and bar code 111 may be stored in the memory.

Even when the memory is provided to optical disc library apparatus 200, replacement and repair of parts including the memory occasionally causes erasing of the magazine-disc association information stored in the memory.

In view of a cost of magazines 101, RFID tags 110 and bar codes 111 occasionally do not have enough capacities for storing the magazine-disc association information.

Further, when the magazine-disc association information as well as information about all optical discs 1 stored in magazines 101 during manufacturing of magazines 101 is recorded in RFID tags 110, takt times during manufacturing magazines 101 increase, and this causes an increase in the manufacturing cost. As a result, disc information 301 cannot be occasionally stored in RFID tags 110.

When controller 223 of optical disc library apparatus 200 has low performance, all information about magazines 101 cannot be managed in some cases.

In order to cope with such circumstances, optical disc library apparatus 200 has a function for notifying host server 230 of information necessary for obtaining the magazine-disc association information. For example, an Application Programming Interface (API) provides a mechanism in which host server 230 obtains the magazine-disc association information. As a result, it is possible to handle the magazine-disc association information with redundancy.

Figure 6:
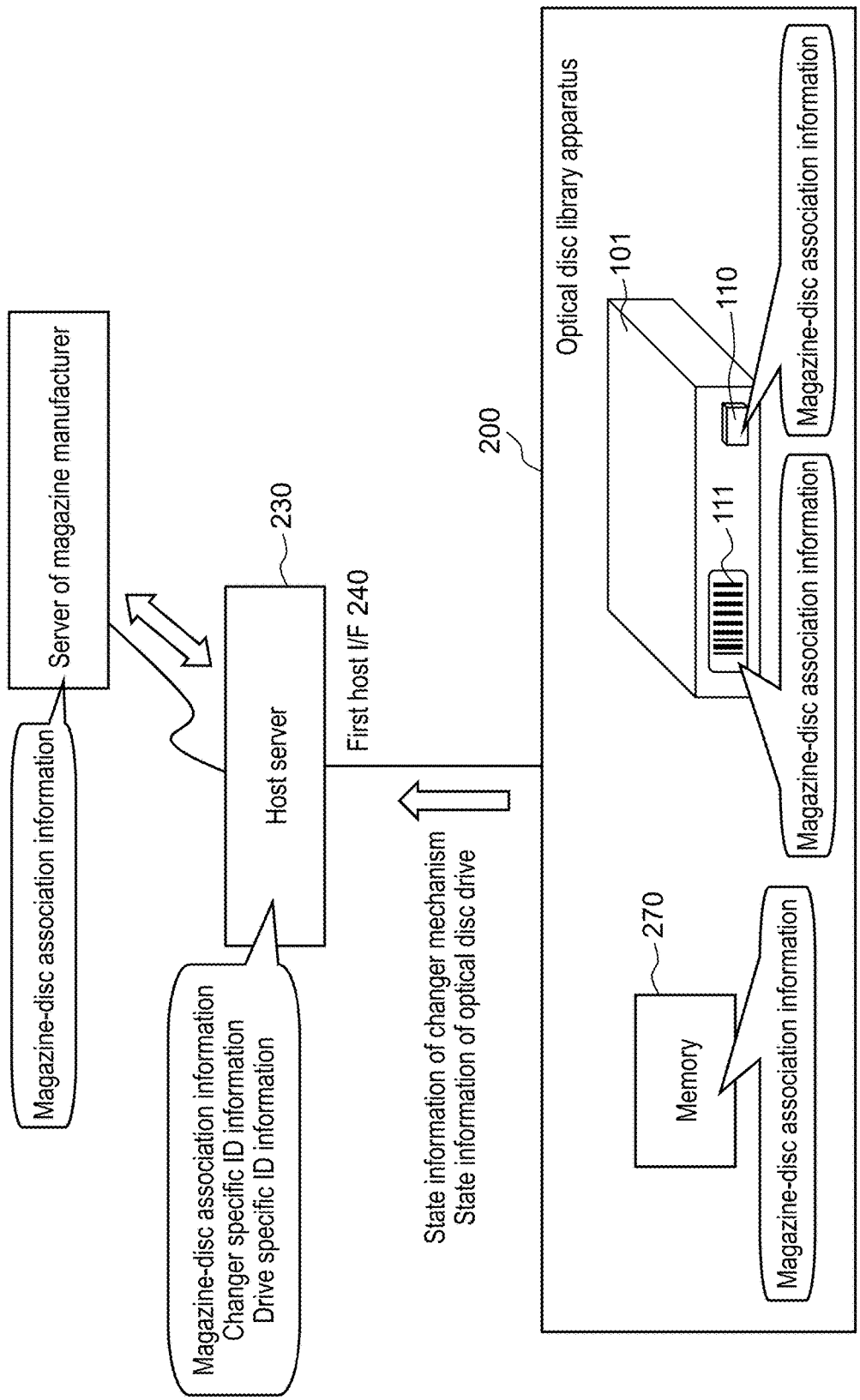
FIG. 6 is a diagram describing an information management image of the optical disc library system according to the first exemplary embodiment.

FIG. 6 is a diagram describing an information management image of the optical disc library system according to the present exemplary embodiment. As shown in FIG. 6, optical disc library apparatus 200 includes nonvolatile memory 270. The magazine-disc association information which is the same as RFID tags 110 and bar codes 111 is stored also in memory 270. Even when optical disc library apparatus 200 is accidentally powered off, the information remains in memory 270 because of the nonvolatile memory.

Since optical disc library apparatus 200 has the functions for notifying host server 230 of the magazine-disc association information, the changer specific ID information, and the drive specific ID information via first host I/F 240, host server 230 can manage these pieces of information. Further, host server 230 is connected to an external memory such as a Solid State Drive (SSD) or an HDD so as to maintain redundancy.

In the above description, memory 270 is a nonvolatile memory, but a volatile memory also can achieve the similar effect. For example, optical disc library apparatus 200 obtains BCA information as serial numbers of optical discs 1 attached to the magazines corresponding to disc specific ID information, and the magazine specific ID information about the attached magazines at any timing so as to be stored in a volatile memory. When a request is received by the API, optical disc library apparatus 200 may notify these pieces of information.

Further, a magazine manufacturer may manage the magazine-disc association information during manufacturing of the magazines. In this case, host server 230 accesses a server of the magazine manufacturer via an internet, and obtains the magazine-disc association information during manufacturing of the magazines.

According to this constitution, for example, even when RFID tag 110 cannot be read or bar code 111 is damaged, the magazine-disc association information can be restored by rewriting the magazine-disc association information in RFID tag 110 or sticking new bar code 111 because host server 230 retains the magazine-disc association information.

Further, even when optical disc library apparatus 200 abnormally stops that optical disc 1 stored in magazine 101, from which the magazine-disc association information of RFID tag 110 cannot be read, is loaded to any optical disc drive 210, host server 230 obtains the state information about optical disc drive 210 and the disc specific ID information about loaded optical disc 1. And host server 230 checks the pieces of obtained information against the magazine-disc association information stored in host server 230 or the magazine-disc association information stored in a database of the magazine manufacturer, so that host server 230 finds optical disc drive 210 to return the loaded optical disc 1 and recovers.

Even when not the magazine-disc association information but only the magazine specific ID information is recorded in RFID tag 110 and bar code 111, host server 230 checks the magazine specific ID information against the magazine-disc association information stored in host server 230 or the server of the magazine manufacturer, so that optical disc 1 can be specified.

The constitution where host server 230 is connected to optical disc library apparatus 200 via first host I/F 240 and second host I/F 250 as the host I/Fs in the optical disc library system 500 according to the present exemplary embodiment is described, but a connecting form is not limited to this form. For example, optical disc library apparatus 200 is provided with a CPU board which can control both changer mechanism 220 and optical disc drive 210, host server 230 and optical disc library apparatus 200 may be connected by one host I/F so as to be controlled.

In general, the changer system and the library system mostly perform respective operations and obtain information in element address unit. An element means a media transfer unit, a data transfer unit, a storage and the like. For example, in optical disc library apparatus 200, changer mechanism 220 as the media transfer unit or one optical disc drive 210 as the data transfer unit is one element. An attention should be paid to the storage. For example, since the apparatuses, disclosed in the citation list, are presupposed that the plurality of optical discs provided to the magazine is treated in a collective manner, the magazine is one element as the storage, and an element address is given to each magazine. In the present exemplary embodiment, one optical disc 1 stored in magazine 101 is one element as the storage, and an element address is given to each optical disc 1. More concretely, element addresses are given to the physical positions of twelve optical discs 1 in magazine 101, respectively, as an accessible unit. That is to say, when twelve optical discs 1 are stored in one magazine 101, twelve element addresses are given to one magazine 101, and when the plurality of magazines 101 is present in optical disc library apparatus 200, element addresses are given to all optical discs 1 of all magazines 101, respectively.

If the element address is changed while in use, a host cannot control elements. For this reason, optical discs 1 present in optical disc library apparatus 200 should be always given same element addresses. For example, a control is made by using the magazine specific ID information included in magazine information 300 provided to RFID tag 110 and the like, the position information or disc specific ID information included in disc information 301, shown in FIG. 4 so that one element address is given to one optical disc 1. For example, element addresses "0" to "11" are allocated to magazine 101 with the magazine specific ID information "0123456789", and element addresses "12" to "23" are allocated to another magazine 101. Further, as to the position information, the element addresses are given to twelve optical discs 1 in magazine 101 with the magazine specific ID information "0123456789" in a manner that element address "0" is allocated to first optical disc 1, "1" is allocated to second optical disc 1, . . . , and "11" is allocated to twelfth optical disc 1.

The present exemplary embodiment described that even when abnormal stop occurs, each combination of each magazine 101 and optical discs 1 stored in each magazine 101, and the positions of optical discs 1 in each magazine 101 can be always returned to original positions. In other words, also when optical disc library apparatus 200 is brought into an abnormal state during the use of the apparatus, determined element addresses can be given to optical discs 1.

The description refers to the constitution where changer mechanism 220 is constituted so as to have two mechanisms including magazine carrier mechanism 221 and disc carrier mechanism 222, but the present disclosure is not limited to this constitution. For example, when magazine 101 is not stored in a direct stack system, and optical discs 1 can be taken out one by one from provided trays, magazine carrier mechanism 221 is not necessary, and only disc carrier mechanism 222 may be provided.

Second host I/F 250 may be used for not only a parallel communication system but also a serial communication system. Further, changer mechanism 220 may be connected to optical disc drive 210 by the serial communication system. When optical disc drive 210 is a tray type drive, it can be controlled separately from second host I/F 250 at a time of tray control.

2. Recovery Process

A recovery process at the time of the abnormal stop of optical disc library apparatus 200 is described below. The recovery process in a case where abnormal stop occurs with optical disc 1 being loaded to optical disc drive 210 is described.

Figure 7:
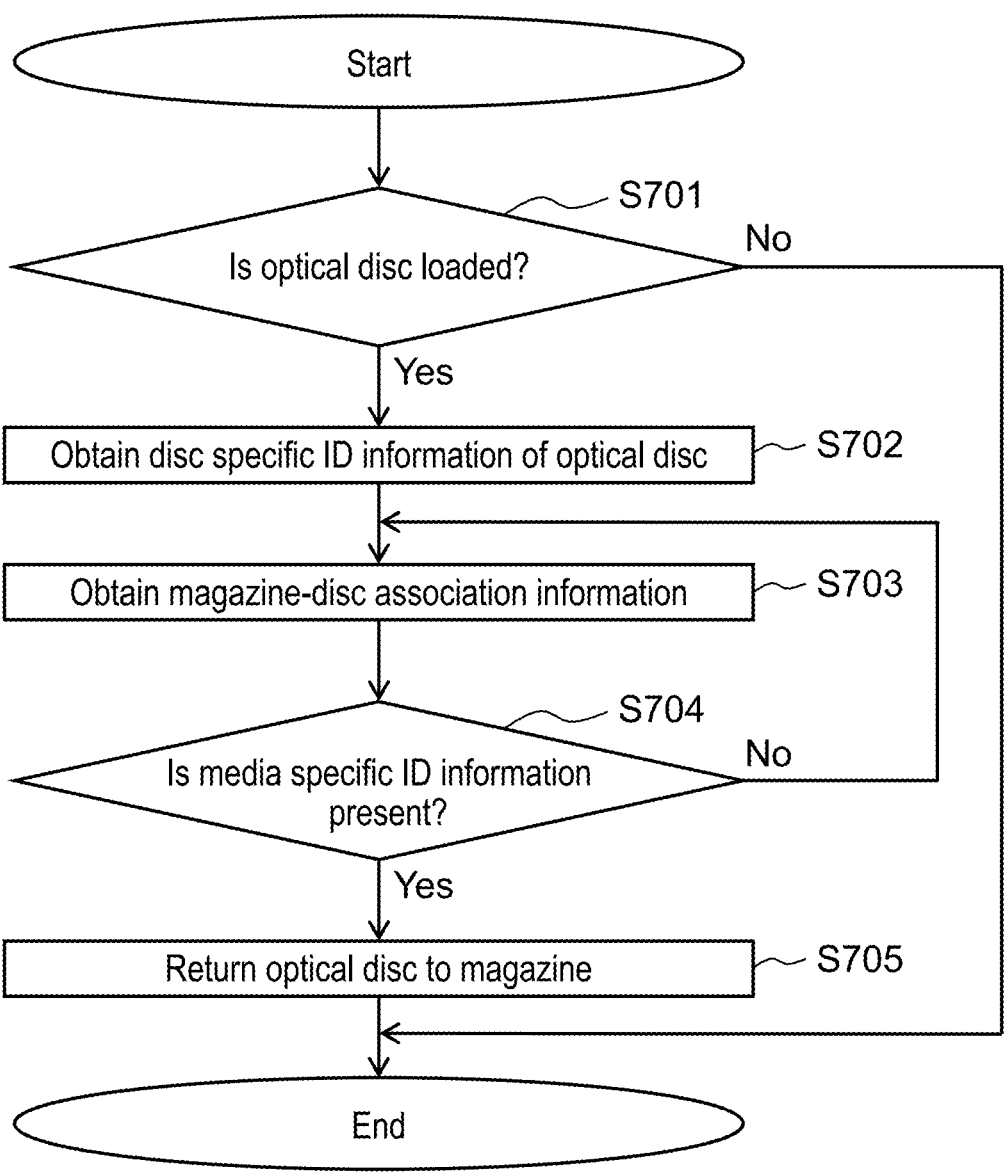
FIG. 7 is a flowchart describing a recovery process according to the first exemplary embodiment.

2-1. Case Where the Magazine-Disc Association Information of the RFID Tag is Used FIG. 7 is a flowchart describing the recovery process according to the present exemplary embodiment. A case where the magazine-disc association information stored in RFID tag 110 is used is described below. Host server 230 executes the following steps on each of twelve optical disc drives 210 of optical disc library apparatus 200.

(Step S701) Host server 230 transfers optical disc drive 210 to an activate request of optical disc 1 via second host I/F 250. Optical disc drive 210 receives the activate request from host server 230 so as to activate optical disc 1. When optical disc 1 is loaded to optical disc drive 210, optical disc 1 is activated, but when optical disc 1 is not loaded to optical disc drive 210, optical disc 1 is not activated. Optical disc drive 210 returns a result of the activate request to host server 230 via second host I/F 250. When optical disc drive 210 is activated, "Good" as the result is returned, and when optical disc drive 210 is not activated, "No Disc" as the result is returned. Host server 230 can determine whether optical disc 1 is loaded to optical disc drive 210 based on the result of the activate request. When optical disc 1 is loaded to optical disc drive 210 (Yes), the process proceeds to step S702, and when optical disc 1 is not loaded to optical disc drive 210 (No), the process is ended.

(Step S702) Host server 230 requests optical disc drive 210 to obtain disc specific ID information about loaded optical disc 1 via second host I/F 250. Optical disc drive 210 reads a serial number stored in BCA 10 of optical disc 1, and returns a disc specific ID number to host server 230 via second host I/F 250.

(Step S703) Host server 230 requests changer mechanism 220 to obtain the magazine-disc association information of RFID tag 110 of magazine 101 via first host I/F 240. Changer mechanism 220 reads the magazine-disc association information of RFID tag 110 of any magazine 101, and notifies host server 230 of the read information via first host I/F 240.

The magazine-disc association information of RFID tag 110 includes at least the magazine specific ID information, the disc specific ID information about stored optical disc 1, and the position information about corresponding optical disc 1. As described above, in optical disc library apparatus 200, instruction is performed at element address unit. However, element addresses are not given to magazines 101. For this reason, since twelve elements are present in one magazine, the magazine-disc association information of RFID tag 110 about magazine 101 is obtained at step 703 in a manner that, for example, the magazine-disc association information of RFID tag 110 about magazine 101 storing an element with element address "0", the magazine-disc association information of RFID tag 110 about magazine 101 storing an element with element address "12", and the like are obtained.

(Step S704) Host server 230 checks whether disc specific ID information that matches with disc specific ID information about optical disc 1 loaded to optical disc drive 210 is present in the obtained magazine-disc association information. When the matched disc specific ID information is present (Yes), the process proceeds to step S705, and when the matched disc specific ID information is not present (No), the process returns to step S703.

(Step S705) Host server 230 instructs changer mechanism 220 to return optical disc 1 to original magazine 101 using the magazine specific ID information, the disc specific ID information and the position information about optical disc 1 based on the obtained magazine-disc association information and the magazine correspondence information via first host I/F 240. Changer mechanism 220 returns optical disc 1 to original magazine 101.

The description refers to that host server 230 obtains the magazine-disc association information of RFID tag 110 of magazine 101 during the recovery process. However, a timing of obtaining the magazine-disc association information is not limited to this. The information may be obtained before the recovery process, such as at a time of powering on optical disc library apparatus 200.

The description refers to that host server 230 executes the above recovery process for each optical disc drive 210, but the execution of the process is not limited to this. Host server 230 may first determine whether optical discs 1 are loaded to all twelve optical disc drives 210, and may execute step S702 to step S705 on all loaded optical discs 1 collectively.

Figure 8:
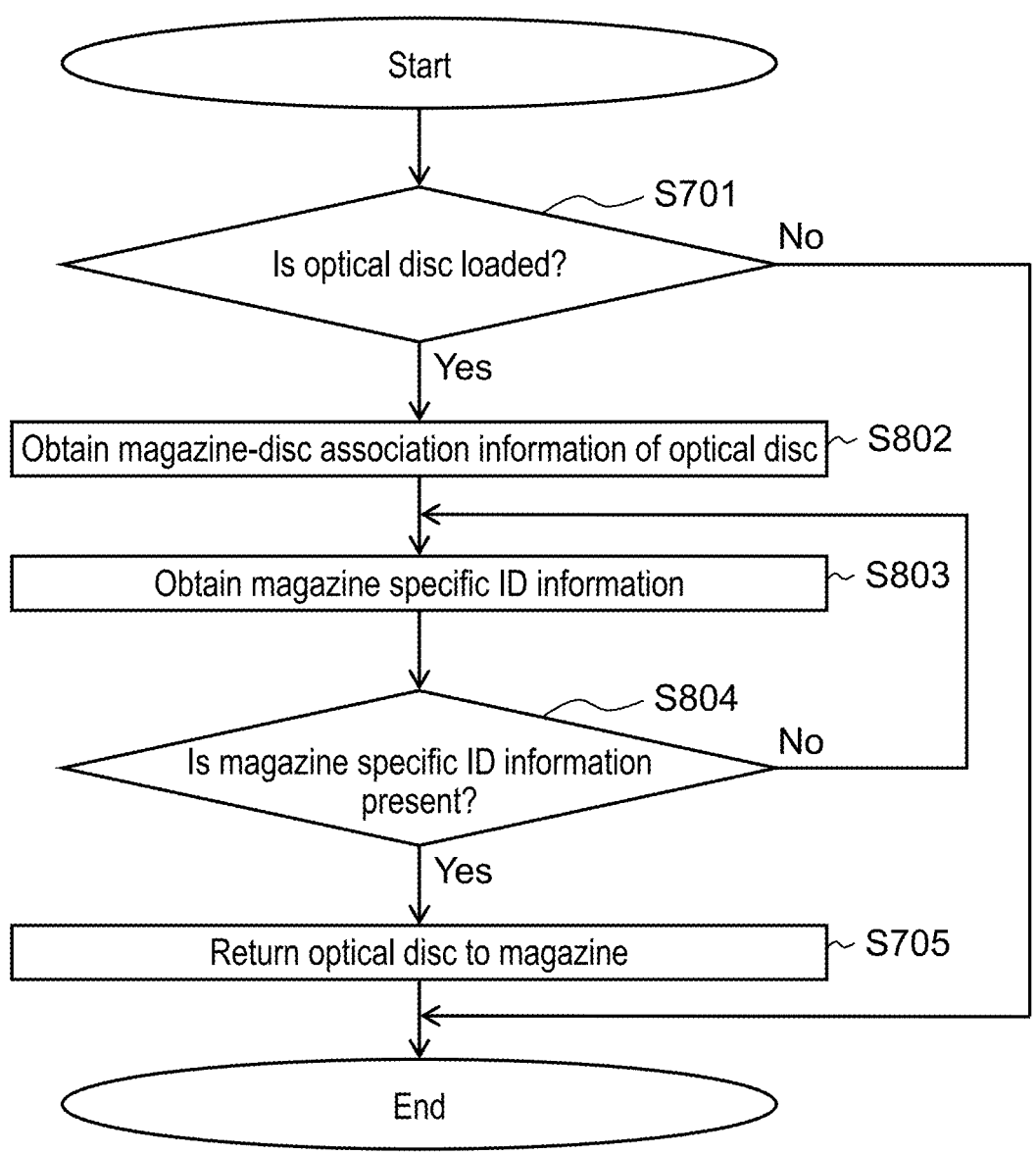
FIG. 8 is another flowchart describing the recovery process according to the first exemplary embodiment.

2-2. Case Where the Magazine-Disc Association Information About the Optical Disc is Used FIG. 8 is a flowchart describing the recovery process according to the present exemplary embodiment. A case where the magazine-disc association information stored in optical disc 1 is used is described below. Steps that are the same as the steps described with reference to FIG. 7 are denoted by the same step numbers, and description thereof is omitted. Host server 230 executes the following steps on each of twelve optical disc drives 210 of optical disc library apparatus 200.

(Step S802) Host server 230 requests optical disc drives 210 to obtain disc specific ID information about loaded optical discs 1 and magazine-disc association information via second host I/F 250. Optical disc drives 210 obtain the disc specific ID information about optical discs 1 and the magazine-disc association information, and notify host server 230 of the disc specific ID information about optical discs 1 and the magazine-disc association information via second host I/F 250.

(Step S803) Host server 230 requests changer mechanism 220 to obtain the magazine-disc association information of RFID tag 110 of any magazine 101 via first host I/F 240. Changer mechanism 220 reads the magazine-disc association information of RFID tag 110 of any magazine 101, and notifies host server 230 of the magazine specific ID information about any magazine 101 from the read magazine-disc association information via first host I/F 240. Host server 230 obtains the magazine specific ID information.

(Step S804) Host server 230 checks whether the obtained magazine specific ID information is present in the magazine-disc association information. When the magazine specific ID information is present (Yes), the process proceeds to step S705, and when the magazine specific ID information is not present (No), the process returns to step S803.

The description refers to that host server 230 obtains the magazine specific ID information from the magazine-disc association information of RFID tag 110 of magazine 101 during the recovery process. However, a timing of obtaining the magazine specific ID information is not limited to this. The information may be obtained before the recovery process, such as at a time of powering on optical disc library apparatus 200.

The description refers to that the magazine-disc association information is stored in RFID tag 110, but the storage is not limited to this. Only the magazine specific ID information may be stored in RFID tag 110.

The description refers to that host server 230 executes the above recovery process for each optical disc drive 210, but the execution of the process is not limited to this. Host server 230 may first determine whether optical discs 1 are loaded to all twelve optical disc drives 210, and may execute step S802 to step S804, and step S705 on all loaded optical discs 1 collectively.

2-3. Case where the Magazine-Disc Association Information of a Server of a Magazine Manufacturer is Used FIG. 9 is a flowchart describing the recovery process according to the present exemplary embodiment. The description refers to a case where information stored in RFID tag 110 is only the magazine specific ID information, and the magazine-disc association information of a server of a magazine manufacturer is used. Steps that are the same as the steps described with reference to FIG. 7 are denoted by the same step numbers, and description thereof is omitted. Host server 230 executes the following steps on each of twelve optical disc drives 210 of optical disc library apparatus 200.

(Step S903) Host server 230 obtains magazine-disc association information including the obtained disc specific ID information from the server of the magazine manufacturer.

(Step S904) Host server 230 requests changer mechanism 220 to obtain magazine specific ID information about any magazine 101 via first host I/F 240. Changer mechanism 220 obtains the magazine specific ID information recorded in RFID tag 110 of any magazine 101, and notifies host server 230 of the obtained information via first host I/F 240.

(Step S905) Host server 230 checks whether the obtained magazine specific ID information matches with disc specific ID information of the magazine-disc association information. When the obtained magazine specific ID information matches with the disc specific ID information (Yes), the process proceeds to step S705, and when the obtained magazine specific ID information does not match with the disc specific ID information (No), the process returns to step S904.

The description refers to that host server 230 obtains the magazine specific ID information of RFID tag 110 of magazine 101 during the recovery process. However, a timing of obtaining the magazine specific ID information is not limited to this. The magazine specific ID information of RFID tag 110 of all magazines 101 may be obtained before the recovery process such as at the time of powering on optical disc library apparatus 200.

The description refers to that host server 230 executes the recovery process on each optical disc drive 210, but the execution of the process is not limited to this. Host server 230 may first determine whether optical discs 1 are loaded to all twelve optical disc drives 210, and may execute step S702, step S903 to step S905, and step S705 on all loaded optical disc 1 collectively.

3. Effects

In the optical disc library apparatus according to the present exemplary embodiment, when troubles such as a failure and abnormal stop occur in the optical disc library apparatus, magazine 101 storing optical discs 1 and locations of optical discs 1 in magazine 101 can be specified, so that an original state can be recovered.

Further, as a failure and abnormal stop of optical disc library apparatus 200, apparatus 200 occasionally stops with disc carrier mechanism 222 of changer mechanism 220 holding optical disc 1. As the recovery process in this case, after host server 230 obtains the state information of changer mechanism 220 and optical disc 1 held by disc carrier mechanism 222 is loaded to any optical disc drive 210, the recovery process may be executed.

Second Exemplary Embodiment

The first exemplary embodiment refers to the presupposition that the positions of twelve optical discs 1 in any magazine 101 are fixed.

A second exemplary embodiment refers to a case where locations of twelve optical discs 1 in any magazine 101 are not fixed. Concretely, the description refers to a case where when optical disc 1 taken out of magazine 101 is returned to magazine 101, optical disc 1 is returned to the lowest location in magazine 101.

In the present exemplary embodiment, RFID tag 110 is embedded in magazine 101, and magazine-disc association information is stored in RFID tag 110. In the present exemplary embodiment, the magazine-disc association information is rewritten every time when actual locations of optical discs 1 in magazine 101 are changed.

FIG. 10A, FIG. 10B, and FIG. 10C are diagrams describing one example of the magazine-disc association information stored in RFID tag 110 according to the present exemplary embodiment. A difference from the magazine-disc association information in the first exemplary embodiment is disc information 1001 for specifying a plurality of optical discs 1 stored in magazine 101. Disc information 1001 includes actual position information representing actual locations of optical discs 1.

FIG. 10A illustrates the magazine-disc association information before shipment of magazine 101, and the position information is identical to the actual position information.

FIG. 10B illustrates the magazine-disc association information rewritten after sixth optical disc 1 in magazine 101 is loaded to optical disc drive 210. The actual position information of sixth optical disc 1 is "-" representing sixth optical disc 1 is not present in magazine 101, the position information from seventh optical disc 1 to twelfth optical disc 1 adds one to the actual position information, the actual position information of seventh optical disc 1 in the position information is changed to "06", and the actual position information of eighth optical disc 1 in the position information is changed to "07".

FIG. 10C illustrates the magazine-disc association information rewritten after sixth optical disc 1 in the position information is again returned to the lowest location in magazine 101. The actual position information of sixth optical disc 1 in the position information is "12".

In optical disc library apparatus according to the present exemplary embodiment, disc information 1001 of the magazine-disc association information in RFID tag 110 includes the actual position information, and when the locations of twelve optical discs 1 in any magazine 101 are not fixed, magazine 101 storing optical discs 1 and the locations of optical discs 1 in magazine 101 can be specified even if a trouble such as a failure or abnormal stop occurs in the optical disc library apparatus, so that the original state can be recovered.

The present exemplary embodiment refers to that when optical disc 1 returns to magazine 101, the disc is returned to the lowest location, but present disclosure is not limited to this. For example, optical disc 1 may be returned to the highest location.

Another Exemplary Embodiments

The above describes the first to second exemplary embodiments as technical examples of the present disclosure. However, a technique in the present disclosure is not limited to the exemplary embodiments, and the technique can be applied also to any exemplary embodiments where modifications, replacements, additions and omissions are carried out. Further, the components described in the first and second exemplary embodiments can be combined so that new exemplary embodiments can be formed.

Other exemplary embodiments are, therefore, described below.

In the first exemplary embodiment and the second exemplary embodiment, twelve optical discs 1 are stored in magazine 101, but a number of optical discs 1 is not limited to this, and any plural number of optical discs 1 may be stored. Further, optical disc 1 is a recordable optical disc, but the type of optical disc 1 is not limited to this, and it may be a rewritable one.

Further, the first exemplary embodiment and the second exemplary embodiment describe that twelve optical disc drives 210 are provided to optical disc library apparatus 200, and twelve optical discs 1 are embedded in magazine 101, but numbers of them are not limited to identical twelve.

The first exemplary embodiment and the second exemplary embodiment describe that one optical disc library apparatus 200 is provided to optical disc library system 500, but a number of optical disc library apparatus 200 is not limited to one. A plurality of optical disc library apparatuses 200 may be connected to host server 230. Further, each of the plurality of optical disc library apparatuses 200 does not include magazine carrier mechanism 221, and one magazine carrier mechanism 221 may be shared by the plurality of optical disc library apparatuses 200.

Since the above exemplary embodiments illustrate the technique in the present disclosure, various modifications, replacements, additions, and omission can be made within the scope of claims or an equivalent scope of claims.

What is claimed is:

1. An optical disc library apparatus comprising:
one or more magazines configured to store a plurality of optical discs;
a plurality of optical disc drives configured to perform recording or reproducing on or from the optical discs;
a changer mechanism configured to perform loading or ejecting any of the optical discs stored in the magazine to or from any of the optical disc drives; and
a controller configured to control the changer mechanism, wherein
the magazine includes magazine-disc association information associating magazine information specifying the magazine with disc information specifying the plurality of optical discs stored in the magazine, and
the controller outputs the magazine-disc association information;
wherein the magazine information includes magazine specific ID information specifying the magazine, and
the disc information includes a plurality of combinations of optical disc specific ID information specifying the optical disc and the position information specifying position of the optical disc in the magazine.

2. The optical disc library apparatus according to claim 1, wherein the changer mechanism includes a magazine carrier mechanism and a disc carrier mechanism,
the magazine carrier mechanism carries the magazine, and
the disc carrier mechanism performs loading or ejecting any of the optical discs stored in the magazine to or from any of optical disc drives.

3. The optical disc library apparatus according to claim 2, wherein the controller outputs changer specific ID information specifying the disc carrier mechanism.

4. The optical disc library apparatus according to claim 3, wherein the controller outputs state information, and
the state information includes holding state of the magazine in the disc carrier mechanism and the magazine specific ID information specifying the magazine when the disc carrier mechanism holds the magazine.

5. The optical disc library apparatus according to claim 1, wherein the controller outputs drive specific ID information specifying the optical disc drive.

6. The optical disc library apparatus according to claim 5, wherein the controller outputs state information, and the state information includes loading state of the optical disc in the optical disc drive and the optical disc specific ID information specifying the optical disc when the optical disc drive loads the optical disc.

7. The optical disc library apparatus according to claim 1, wherein the magazine includes a Radio Frequency IDentifier (RFID) tag storing the magazine-disc association information.

8. The optical disc library apparatus according to claim 1, wherein the magazine includes a bar code storing the magazine-disc association information.

9. An optical disc library apparatus comprising:

one or more magazines configured to store a plurality of optical discs;

a plurality of optical disc drives configured to perform recording or reproducing on or from the optical discs;

a changer mechanism configured to perform loading or ejecting any of the optical discs stored in the magazine to or from any of the optical disc drives; and a controller configured to control the changer mechanism;

wherein the magazine includes:

optical disc specific ID information specifying each of the plurality of optical discs; and disc information specifying position of each of the plurality of optical discs in the magazine;

wherein the controller compares:

a first disk position of the optical disc in the magazine, which is determined with the optical disc specific ID information indicated by the disc information; and a second disk position of the optical disc in the magazine, which is determined with the optical disc specific ID information acquired by the disc drive; and the controller controls the changer mechanism to return the optical disc to original position when the first disk position and the second disk position are different at the comparison.

\* \* \* \* \*